United States Patent [19]

Itoh et al.

[11] Patent Number: 4,663,990
[45] Date of Patent: May 12, 1987

[54] METHOD FOR CONTROLLING CONTINUOUSLY VARIABLE TRANSMISSION

[75] Inventors: Hiroshi Itoh; Mitsuru Takada, both of Toyota, Japan

[73] Assignee: Toyota Jidosha Kabushiki Kaisha, Japan

[21] Appl. No.: 823,129

[22] Filed: Jan. 27, 1986

Related U.S. Application Data

[63] Continuation of Ser. No. 610,606, May 15, 1984, abandoned.

[30] Foreign Application Priority Data

May 23, 1983 [JP] Japan ................................. 58-89190

[51] Int. Cl.⁴ .............................................. B60K 41/16
[52] U.S. Cl. ...................................... 74/866; 74/877; 364/424.1
[58] Field of Search ......................... 74/865, 866, 877; 364/424.1

[56] References Cited

U.S. PATENT DOCUMENTS

| | | | |
|---|---|---|---|
| 4,262,783 | 4/1981 | Scarrott et al. | 74/866 X |
| 4,274,306 | 6/1981 | Yokoi et al. | 74/866 |
| 4,291,594 | 9/1981 | Baudoin | 74/866 X |
| 4,294,341 | 10/1981 | Swart | 74/866 X |
| 4,411,174 | 10/1983 | Yokoi et al. | 74/866 |
| 4,428,257 | 1/1984 | Meyerle et al. | 74/865 |
| 4,458,318 | 7/1984 | Smit et al. | 74/866 X |
| 4,459,878 | 7/1984 | Frank | 74/866 X |
| 4,462,275 | 7/1984 | Mohl et al. | 74/866 |
| 4,466,521 | 8/1984 | Hattori et al. | 192/0.052 |
| 4,470,117 | 9/1984 | Miki et al. | 74/866 X |
| 4,474,081 | 10/1984 | Kinugasa et al. | 74/866 X |
| 4,497,223 | 2/1985 | Maruyama et al. | 74/866 |
| 4,507,986 | 4/1985 | Okamura et al. | 74/866 |
| 4,515,040 | 5/1985 | Takeuchi et al. | 74/866 |

FOREIGN PATENT DOCUMENTS

| | | | |
|---|---|---|---|
| 56-134658 | 10/1981 | Japan | 74/866 |
| 1556888 | 11/1979 | United Kingdom | 74/866 |

*Primary Examiner*—Leslie Braun
*Assistant Examiner*—Dwight G. Diehl
*Attorney, Agent, or Firm*—Parkhurst & Oliff

[57] ABSTRACT

A method for controlling a continuously variable transmission installed in an engine. The method controls the continuously variable transmission so that the actual maximum speed ratio of the continuously variable transmission may be set to be lower than the maximum speed ratio within the range where the speed ratio can be controlled.

11 Claims, 7 Drawing Figures

METHOD FOR CONTROLLING CONTINUOUSLY VARIABLE TRANSMISSION

This is a continuation of application Ser. No. 610,606 filed May 15, 1984 now abandoned.

BACKGROUND OF THE INVENTION

The present invention relates to a method for controlling a continuously variable transmission (hereinafter referred to as CVT), and particularly to a method for controlling the speed ratios of the CVT.

A CVT is driven by a V-belt extending between driving and driven pulleys, with one or both of the pulleys being able to adjust the size of their respective V-shaped openings which hold the V-belt, thereby controlling the revolution ratio between the driving and driven pulleys. The size of the V-shaped opening is varied by changing the amount of pressure being fed into or drained from a hydraulic cylinder of either of the pulleys. The effective diameter of the pulley, therefore, can be varied by changing the amount of pressure being fed into or drained from the hydraulic cylinder, thereby allowing for a continuously varying ratio of driving pulley diameter to driven pulley diameter. The V-shaped openings on the driving and driven pulleys are each defined between a fixed member of the pulley and a movable member of the pulley. The size of the V-shaped opening is dependent upon the pressure inputted to or released from the hydraulic cylinders. A hydraulic apparatus supplies hydraulic pressure to each of the movable pulleys. advantage of such a CVT is that it can obtain a minimum fuel consumption rate.

To improve the control of the CVT, it has been proposed to set a control such as desired engine speed RPMo to be a function of a throttle opening $\theta$ and a vehicle speed V, (U.S. application Ser. No. 574,739, Filing Date Jan. 30, 1984, Title of the invention: METHOD FOR CONTROLLING A CONTINUOUSLY VARIABLE TRANSMISSION). According to the control of the prior application, the desired engine speed RPMo is determined regardless of the limit within which the speed ratio of the CVT can be controlled. Hence, when a throttle opening is small, an actual engine speed RPMe is lowered to the desired engine speed RPMo even after the movable member of the driven pulley contacts a stopper and the speed ratio e of the CVT reaches the maximum value within which the speed ratio e can be controlled. To control the movable member, hydraulic fluid is continuously applied into the hydraulic cylinder of the movable member of the driving pulley. Hence, the tensile force of the belt is forced to increase by the reaction of the stopper. This is reduces the life of the belt.

SUMMARY OF THE INVENTION

The present invention was made in view of the foregoing background and to overcome the foregoing drawbacks. It is an object of this invention to provide a method of controlling a continuously variable transmission which increases the life of the belt.

To attain the above object, a method for controlling a continuously variable transmission installed in a vehicle is provided comprising the steps of detecting an actual engine speed, detecting a parameter which indicates a driving condition of the engine, setting a desired engine speed according to the value of the detected parameter, calculating a difference between the desired engine speed and the actual engine speed, controlling the engine speed or a speed ratio of the continuously variable transmission so that the actual engine speed may equal the desired engine speed, and setting an actual speed ratio whose maximum value is selected to be less than a maximum value of a range of the speed ratio within which the speed ratio can be controlled.

The above object, features and advantages of the present invention will become more apparent from the following description of the preferred embodiment taken in conjunction with the accompanying drawings.

DETAILED DESCRIPTION OF THE PREFERRED EMBODIMENT

The present invention is described in detail with reference to the accompanying drawings which illustrate embodiment of the present invention.

Figure 1:
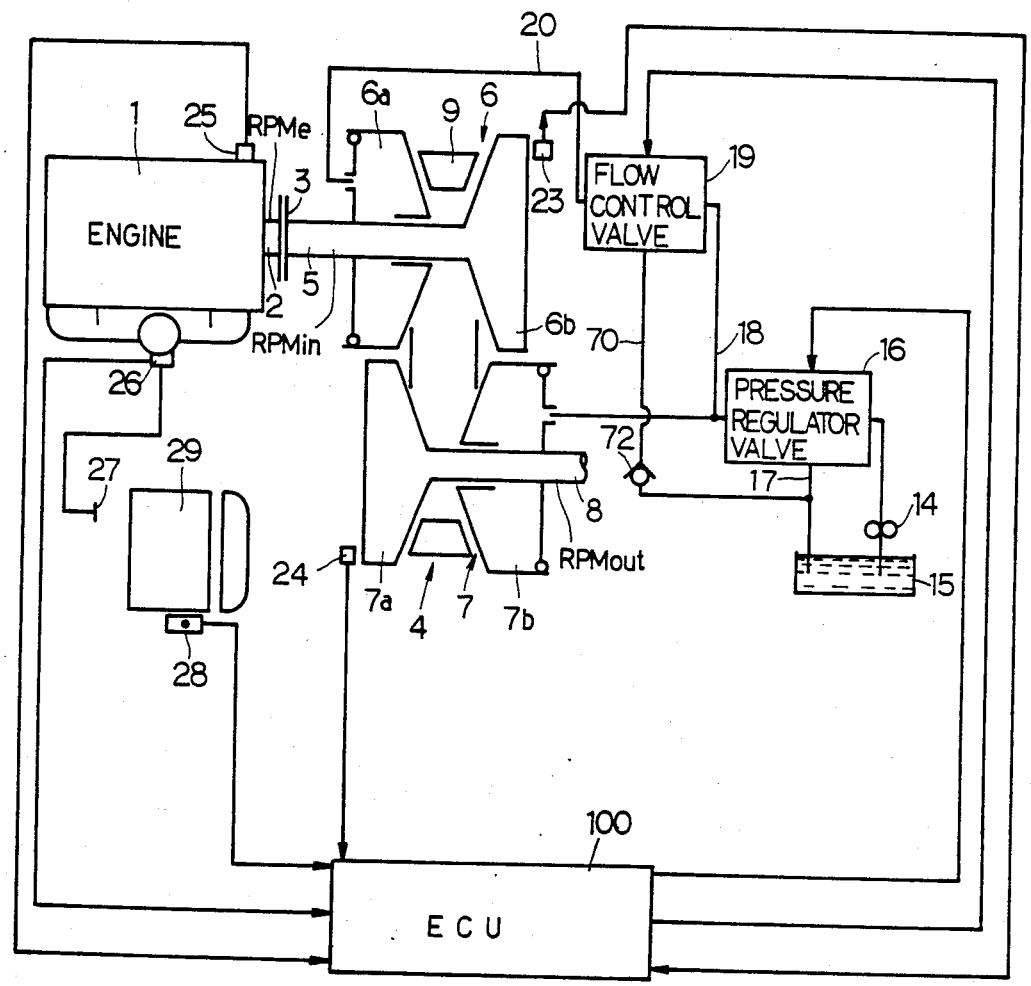
FIG. 1 is a schematic view of the hydraulic apparatus employing the method of the present invention.

FIG. 1 illustrates a schematic view of the hydraulic apparatus employing the method of the present invention. An engine 1 is connected through a crank shaft 2 and a clutch 3 with a shaft 5. The shaft 5 is an input shaft connected with a CVT 4. The CVT 4 has a couple of pulleys 6 and 7. The pulley 6 is a driving pulley mounted on the driving and input shaft 5 which is driven by the engine 1. The other pulley 7 is a driven pulley mounted on a driven and output shaft 8. The torque of the shaft 8 is outputted to wheels (not shown in drawings). A torque transmitting continuous V-belt 9 extends between the pulleys 6 and 7. The driving pulley 6 has a movable member 6a, which is axially displaced on and rotates with the input shaft 5, and a member 6b, which is fixed to and rotates with the input shaft 5. The movable member 6a is axially displaced by the pressure Pin exerted upon it by a hydraulic cylinder 40 shown in FIG. 3. When the movable member 6a is axially displaced in a direction toward the opposite member 6b, space between the members 6a and 6b is decreased. The amount of the oil applied to the cylinder 40 is controlled by a flow control valve 19. To displace the movable member 6a toward opposite member 6b the oil applied to cylinder 40 must be increased. This results in an increase in the effective diameter of the driving pulley 6 which decreases the rotational speed. As a result, the RPM ratio "e", i.e., (the rotational speed of the driven pulley 7) / (the rotational speed of the driving pulley 6, $RPM_{out}/RPM_{in}$) is increased. The $RPM_{in}$ is governed by the engine RPM which is represented by $RPM_e$. Conversely, when the oil applied to cylinder 40 is decreased, the ratio "C" is decreased.

Similarly, the driven pulley 7 has a movable member 7b, which is axially displaceable on and which rotates with the output shaft 8, and a non-movable member 7a, which is fixed to and rotates with the output shaft 8. The movable member 7b is axially displaced by the pressure Pout exerted upon it by a hydraulic cylinder 42 shown in FIG. 3. When the movable member 7b is axially displaced in a direction toward the opposite member 7a, the width defined between the members 7a and 7b is decreased. This results in an increase in the effective diameter of the driven pulley 7.

To minimize the amount of engine power consumed by a hydraulic fluid pump 14, the hydraulic pressure in the cylinder 42 is controlled to be as low as possible while maintaining the torque necessary to keep the belt 9 from slipping while rotating with the driving pulley 6 and the driven pulley 7. The hydraulic pressure of the cylinder 40 is varied to adjust the speed ratioe. The pressure in the hydraulic cylinder 40 is designed to be less than the pressure in the hydraulic cylinder 42. However, even though the value of the hydraulic pressure applied to the hydraulic cylinder 40 is less than the value of the hydraulic pressure applied to the hydraulic cylinder 42, the system is designed so that a greater overall hydraulic pressure is realized in the hydraulic cylinder 42 than in the hydraulic cylinder 40 because the cylinder 40 has a larger square exerted on it by the hydraulic pressure than that of the hydraulic cylinder 42. Hence, it is possible to obtain a RPM ratio of more than or at least equal to one. The CVT 4 is applied with hydraulic fluid by using the following procedure:

The hydraulic fluid pump 14, driven by a motor, pumps hydraulic fluid from a reservoir 15 to a pressure regulator valve 16. The pressure regulator valve 16 controls the pressure of the fluid applied to the oil passage 18 by adjusting an amount of fluid released from the system, thereby generating a specific line pressure $P_L$ in the oil passage 18. The pressure regulator valve 16 supplies the line pressure $P_L$ through the oil passage 18 to the hydraulic cylinder 42 of the driven pulley 7 and to the flow control valve 19. The flow control valve 19 is a three port connection valve, and includes an inlet port communicated with the oil passage 18, a drain port communicated with a drain passage 70 and an outlet port communicated through an oil passage 20 with the hydraulic cylinder 40 of the driving pulley 6. When the flow control valve 19 is in a first position, the inlet port communicates with the outlet port. When the flow control valve 19 is in a second position, there is no communication between the three ports. Finally, when the flow control valve 19 is in a third position, the outlet port communicates with the drain port. A check valve 72 is provided on the drain passage 70. The check valve 72 only allows hydraulic fluid to flow in a single direction, from the flow control valve 19 to the hydraulic fluid reservoir 15.

A sensor 23 detects the rotation speed $RPM_{in}$ of the driving pulley 6. A sensor 24 detects the rotation speed $RPM_{out}$ of the driven pulley 7. An engine coolant temperature sensor 25 is mounted adjacent a cylinder block of the engine 1 and detects the temperature of the engine coolant. A throttle opening sensor 26 detects an amount of a throttle opening of a throttle valve, which is varied in proportion to a stroke of an accelerator pedal 27 installed adjacent to a passenger seat 29. A sensor 28, mounted near the passenger seat 29, detects the position of a shift lever of the transmission. With an automatic transmission, the sensor 28 detects the shift range of the transmission.

The signals detected by the foregoing sensors are inputted to an electronic control unit (hereinafter referred to as ECU) 100. The ECU 100 outputs a control signal to the pressure regulator valve 16 and the flow control valve 19.

When the hydraulic pressure of the cylinder 42 of the movable member 7b of the driven pulley 7 increases, the movable member 7b is displaced approach to the opposite member 7a. The contact point between the driven pulley 7 and the belt 9 then moves to the point which is on the outer portion of the driven pulley 7. The amount of the line pressure $P_L$ is controlled so that there is no slip between the belt 9 and the driven pulley 7. When the hydraulic pressure in the cylinder 40 of the driving pulley 6 increases, the movable member 6a of the driving pulley 6 is displaced to approach to the opposite member 6b. The contact point between the driving pulley 6 and the belt 9 then moves to the point which is on the outer portion of the driving pulley 6. This controls the speed ratios between the driving and driven pulleys.

Figure 2:
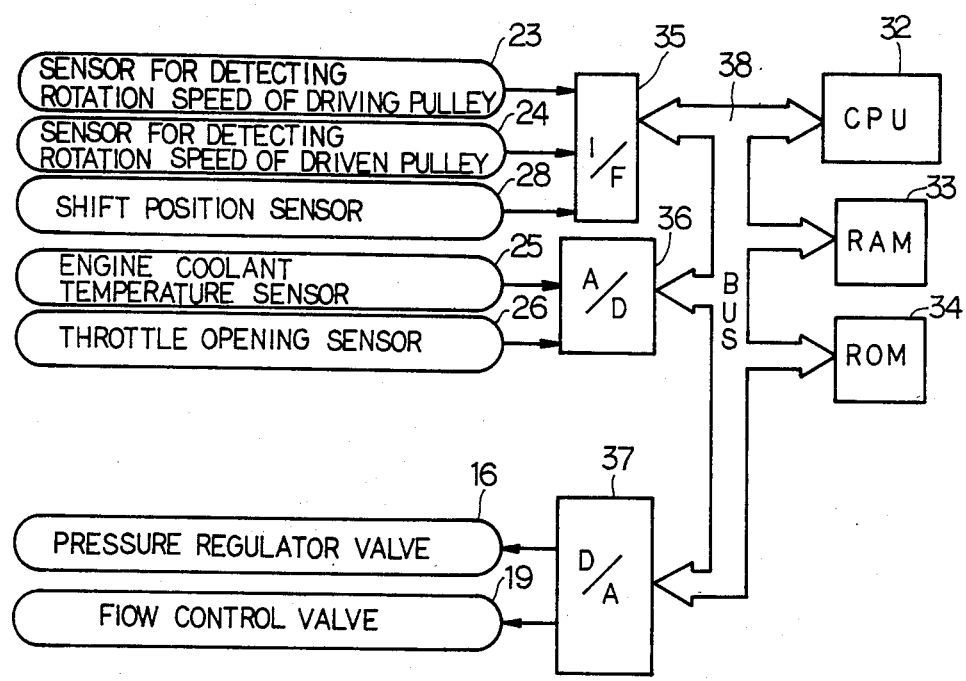
FIG. 2 is a circuit diagram of the electronic control unit employed in the present invention.
Figure 5:
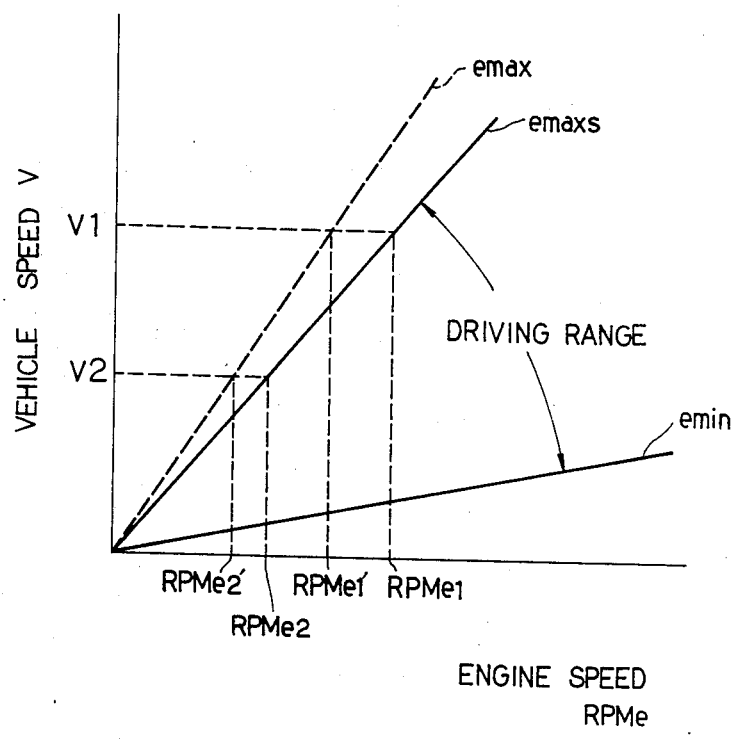
FIG. 5 is a graph illustrating the relationship between an engine speed RPMe and a vehicle speed V.
Figure 6:
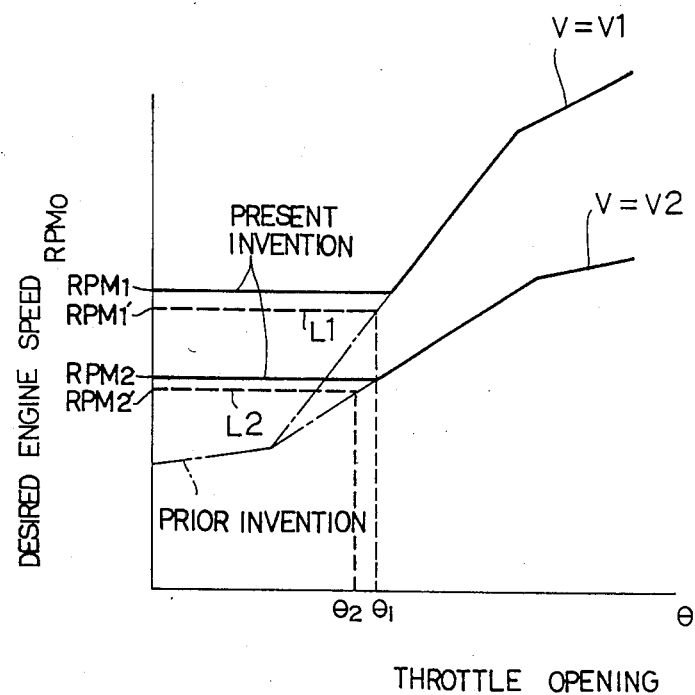
FIG. 6 is a graph illustrating a relation between a throttle opening $\theta$ and a desired engine speed RPMo.

The ECU 100 controls the pressure regulator valve 16 and the flow control valve 19 in accordance wtih the signals detected by the various sensors. FIG. 2 shows that the ECU 100 functions as a digital computer. It has a central processing unit (hereinafter referred to as CPU) 32 which carries out arithmetic and logic processing functions, an inter-face (hereinafter referred to as I/F) 35, an analog-digital converter (hereinafter referred to as A/D) 36, a random-access memory (hereinafter referred to as RAM) 33 which temporarily stores the calculated data of the CPU 32, a read-only memory (hereinafter referred to as ROM) 34 which stores a predetermined control program and arithmetic constants therein, and a digital-analog converter (hereinafter referred to as D/A) 37. They are connected by a common bus 38. An example of how the ECU 100 functions is given by the following: the I/F 35 receives output signals from the sensor 23 corresponding to the rotation speed of the driving pulley 6 ($RPM_{in}$), an output signal from the sensor 24 corresponding to the rotation speed of the driven pulley 7 ($RPM_{out}$), and the shift position sensor 28. The A/D 36 receives the output signals from the engine coolant temperature sensor 25 and the throttle opening sensor 26. The CPU 32, a microprocessor, then compares the outputs received against any stored information, and issues an output to the D/A 37 which then subsequently outputs any appropriate instructions to the pressure regulator valve 16 and the flow control valve 19. The ROM memory means 34 works in conjunction with the CPU data processing means 32 in the following manner: The ROM 34 stores a data map which includes the speed ratios, as shown in FIG. 5, and the desired engine speed, as shown in FIG. 6. The CPU data processing means 32 compares the actual operating conditions with the data stored in the ROM 34, and if appropriate, outputs a signal which controls the regulator valve 16 and the flow control valve 19.

Figure 3:
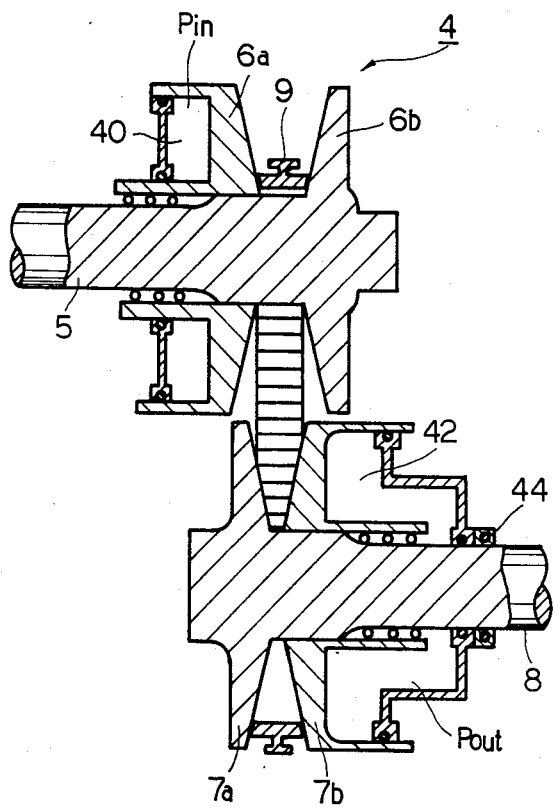
FIG. 3 is a detailed cross-sectional view of the continuously variable transmission.

FIG. 3 shows a detailed cross-sectional view of the CVT 4. The numerals 40 and 42 designate the hydraulic cylinders of the driving pulley 6 and the driven pulley 7, respectively. The numeral 44 designates the stopper which restrains the movement of the movable member 7b of the driven pulley 7. When the outer side face of the movable member 7b strikes against the stopper 44, it is impossible to increase the speed ratio e. If the actual engine speed RPMe is more than the desired engine speed RPMo, the hydraulic fluid is applied to the hydraulic cylinder 40 of the driving pulley 6. The tensile force of the belt 9 then increases by the reaction force of the stopper 44, and this shortens the life of the belt 9.

Figure 4:
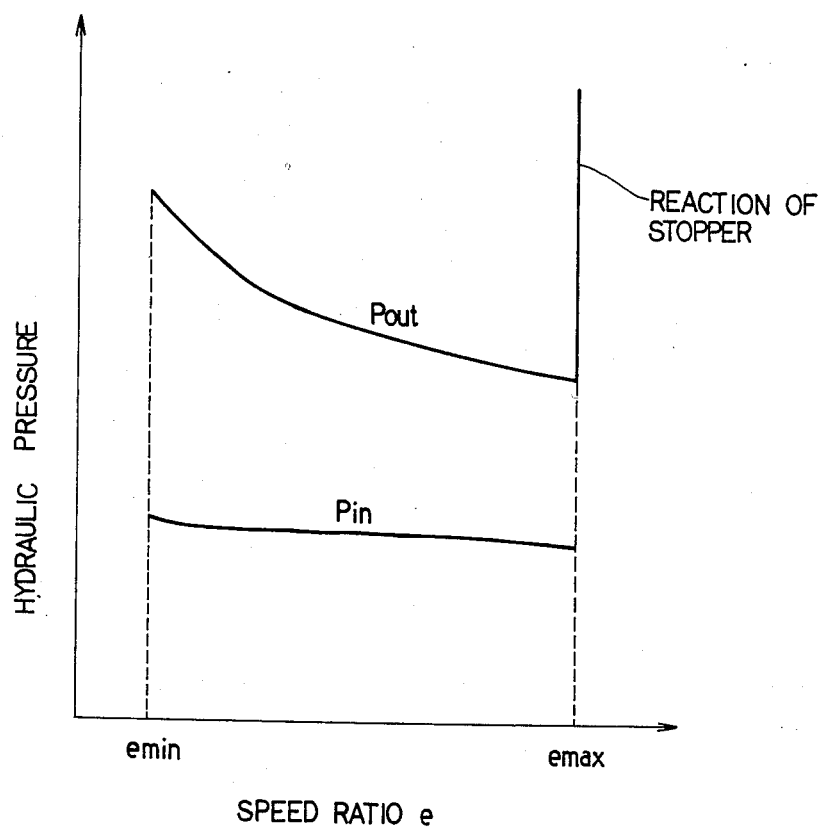
FIG. 4 is a graph illustrating the relationship between speed ratio e and a hydraulic pressure applied into the hydraulic cylinders of the driving and driven pulleys.

FIG. 4 is a graph illustrating a relation between a speed ratio e and a hydraulic pressure applied into the hydraulic cylinders of the driving and driven pulleys. The speed ratio e is designed to be controlled within the range defined between its lower limit $e_{min}$ and its upper limit $e_{max}$. The references Pin and Pout designate the hydraulic pressures of the hydraulic cylinders 40 and 42, respectively. As apparent from FIG. 4, if the hydraulic pressure is applied into the hydraulic cylinder 40 of the driving pulley after the speed ratio e reaches its upper limit $e_{max}$, a reaction force is generated by the stopper 44. This reaction force shortens the life of the belt 9, in the same way that an increase in hydraulic pressure Pout of the hydraulic cylinder 42 does.

FIG. 5 shows a graph illustrating a relation between an engine speed RPMe and a vehicle speed V. The line indicated by, $e_{max}$ is a maximum value of a range within which the speed ratio e of the CVT 4 can be controlled. The line indicated by $e_{min}$ is a minimum value of the speed ratio of the range within which the speed ratio e of the CVT 4 can be controlled. The solid line designated by the reference $e_{maxs}$ is a maximum value of the speed ratio of a range within which the speed ratio e of the CVT 4 can be controlled, according to the method of the present invention. The value of the $e_{maxs}$ is designed to be a little less than that of the $e_{max}$. According to the present invention, the speed ratio e is controlled within a range defined between $e_{maxs}$ and $e_{min}$. Hence, the desired speed ratio $e_o$ is determined to be a value within this range.

FIG. 6 shows a graph illustrating a relationship between a throttle opening $\theta$ and a desired engine speed RPMo. A vehicle speed V is employed as a parameter. In FIG. 6, only two examples of the desired vehicle speeds V1 and V2 are shown in order to simplify the explanation, but the desired engine speed RPMo is defined for many vehicle speeds in the actual CVT 4. The broken line L1 designates the expected engine speed RPMe corresponding to the vehicle speed V1 for a throttle opening which is smaller than a predetermined throttle opening $\theta 1$; when the CVT 4 is adjusted to the maximum speed ratio $e_{max}$. (i.e., when the CVT 4 is adjusted to the maximum speed ratio $e_{max}$, the vehicle speed is $V_1$ and the throttle opening is equal to or less than $\theta 1$, the expected engine speed is $L_1$ or $RPM_1'$). Similarly, the broken line L2 designates the expected engine speed RPMe corresponding to the vehicle speed V2 for a throttle opening which is smaller than a predetermined throttle opening $\theta 2$; when the CVT 4 is adjusted to the maximum speed ratio $e_{max}$. (i.e., when the CVT 4 is adjusted to the maximum speed ratio $e_{max}$, the vehicle speed is V2 and the throttle opening $\theta$ is less than or equal to $\theta 2$, then the expected engine speed is L2 or $RPM_2'$. According to the present embodiment of the invention, the minimum values of the desired engine speed RPMo (indicated by solid lines) are designed to be a little more than the engine speed RPMe. The minimum values of the desired engine speed RPMo, indicated by the solid lines, correspond to the vehicle speeds V1 and V2.

According to the CVT disclosed in the prior patent application, which was described above, the desired engine speed RPMo was adjusted when the value of the desired engine speed was less than the value indicated by the lines L1 and L2, within the controlled range. Thus, the desired engine speed RPMo was determined regardless of the range within which the desired engine speed could be controlled. Hence, when the throttle opening $\theta$ was less than $\theta 1$ shown in FIG. 6, the tensile force of the belt 9 was increased by the reaction force of the stopper.

Figure 7:
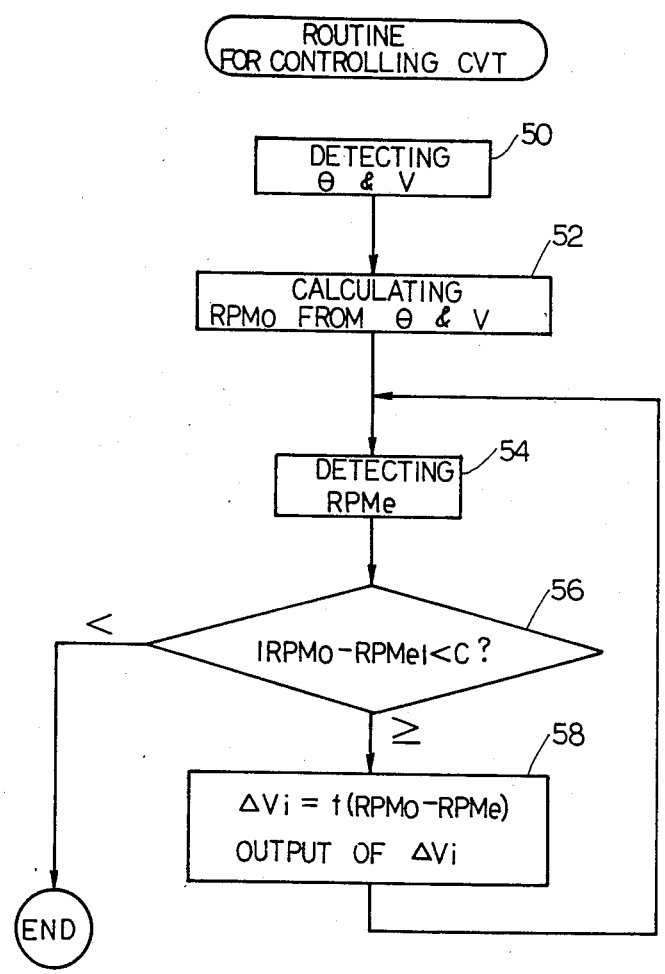
FIG. 7 is a flow chart illustrating operations according to the present invention.

FIG. 7 shows a flow control chart illustrating the routine for controlling operations of the present invention. The voltage Vi, which is fed into the flow control valve 19, is controlled by the differential between the desired engine speed RPMo and the actual engine speed RPMe. This results in the variation of the speed ratio e of the CVT 4 or the engine speed RPMe. When it is necessary to increase the engine speed RPMe, that is, to decrease the speed ratio e, the voltage Vi, which is fed into the flow control valve 19, is decreased. This results in a decrease in the volume of the hydraulic fluid supplied into the hydraulic cylinder 40.

In step 50, the throttle opening $\theta$ and the vehicle speed V are detected. The program proceeds to step 52. In step 52, the desired engine speed RPMo which is defined by the solid line in FIG. 6, is calculated as a function of the throttle opening $\theta$ and the vehicle speed V. The program proceeds to step 54. In step 54, the actual engine speed RPMe (=the actual rotational speed RPMin of the driving pulley 6) is detected by sensor 23. The program proceeds to step 56. In step 56, the absolute value of the difference between the desired engine speed RPMo and the actual engine speed RPMe, |RPMo-RPMe| is compared with a predetermined value C. If the value |RPMo-RPMe| is less than C, the routine ends. This condition means that the actual engine speed RPMe is very close to the desired engine speed RPMo. On the other hand, if the value |RPMo-RPMe| is equal to or greater than C, the program proceeds to step 58. This condition means that the actual engine speed RPMe is quite different from the desired engine speed RPMo. In step 58, the amount of the voltage $\Delta$ Vi to be changed is calculated as a function of the difference between the desired engine speed RPMo and the actual engine speed RPMe, (RPMo-RPMe). Step 58 outputs the voltage $\Delta$ Vi, and the program returns to step 54.

While the present invention has been described in its preferred embodiments, it is to be understood that the invention is not limited thereto, and may be otherwise embodied within the scope of the following claims.

What is claimed is:

1. A method for controlling a continuously variable transmission in a vehicle, said vehicle including an engine, a means for detecting throttle opening, a memory means for storing at least one relationship between desired engine speed and throttle opening and for storing a value indicative of a predetermined amount of throttle opening for said at least one relationship, said desired engine speed in said at least one relationship being maintained at a constant value when said means for detecting throttle opening detects a throttle opening which is less than said predetermined amount of throttle opening in said at least one relationship, said constant value being greater than a value corresponding to a point on said at least one relationship at which said continuously variable transmission is adjusted to a maximum speed ratio, said transmission including a hydraulic cylinder actuating a movable member of a driving pulley, and a flow control means for controlling the amount of fluid supplied into the hydraulic cylinder, the method comprising the steps of:
- detecting an actual engine speed;
- detecting the throttle opening;
- determining a desired engine speed according to said at least one relationship;
- calculating a difference between the determined desired engine speed and the detected actual engine speed;
- comparing the absolute value of said calculated difference with a predetermined constant stored in the memory means; and
- when the predetermined constant is equal to or smaller than the absolute value of the calculated difference, outputting a control signal to the flow control means for controlling the amount of fluid supplied to the hydraulic cylinder.

2. The method for controlling the continuously variable transmission of claim 1, wherein the continuously variable transmission includes the driving pulley, a driven pulley and a belt member spanning the driving and driven pulleys.

3. The method for controlling a continuously variable transmission according to claim 1, wherein said at least one relationship comprises a plurality of relationships, each relationship of said plurality of relationships corresponding to a vehicle speed.

4. A method for controlling an amount of fluid supplied to a hydraulic cylinder of a driving pulley of a continuously variable transmission which is mounted on a vehicle including an engine, a means for detecting throttle opening and a memory means for storing at least one relationship between desired engine speed and throttle opening and for storing a value indicative of a predetermined amount of throttle opening for said at least one relationship, said desired engine speed in said at least one relationship being maintained at a constant value when said means for detecting throttle opening detects a throttle opening which is less than said predetermined amount of throttle opening in said at least one relationship, said constant value being greater than a value corresponding to a point on said at least one relationship at which said continuously variable transmission is adjusted to a maximum speed ratio, said driving pulley of said transmission comprising a fixed member and a movable member, the movable member adapted to be moved by said hydraulic cylinder, said fixed member and said movable member shaped so as to form a V-shaped opening between the movable member and the fixed member, a driven pulley with a second fixed member and a second movable member, the second movable member adapted to be moved by a second hydraulic cylinder, and said second fixed member and said second movable member shaped so as to form a V-shaped opening between the movable member and the fixed member, a belt member spanning the pulleys so that an effective diameter of the pulleys can be varied so that different speed ratios can be obtained, and a flow control means for controlling an amount of fluid supplied into the hydraulic cylinder of the driving pulley, the method comprising the steps of:
- detecting a throttle opening of a throttle valve provided in an engine intake system, and detecting a vehicle speed;
- determining a desired engine speed according to said at least one relationship;
- detecting an actual engine speed;
- comparing the absolute value of the difference between the desired engine speed and the detected actual engine speed with a predetermined constant; and
- when the predetermined constant is equal to or smaller than the absolute value of the difference between the desired engine speed and the detected actual engine speed, outputting a control signal to the flow control means for controlling the amount of fluid supplied to the hydraulic cylinder of the driving pulley.

5. The method for controlling a continuously variable transmission according to claim 4, wherein said at least one relationship comprises a plurality of relationships, each relationship of said plurality of relationships corresponding to a vehicle speed.

6. A method for controlling an amount of fluid supplied to a hydraulic cylinder of a driving pulley of a continuously variable transmission comprising:
- detecting throttle opening;
- storing in a memory at least one relationship between desired engine speed and throttle opening and storing a value indicative of a predetermined amount of throttle opening for said at least one relationship, said desired engine speed being maintained in said at least one relationship at a constant value when said means for detecting throttle opening detects an amount of throttle opening which is less than said predetermined amount, said constant value being greater than a value corresponding to a point on said at least one relationship at which said continuously variable transmission is adjusted to a maximum speed ratio;
- detecting a rotational speed of a driven pulley;
- detecting a shift position;
- calculating an actual vehicle speed according to the detected rotational speed;
- detecting an actual engine speed;
- detecting a throttle opening of a throttle valve provided in an intake system of the engine;
- determining a desired engine speed from said at least one relationship;
- calculating a difference between the determined desired engine speed and the detected actual engine speed;
- comparing the absolute value of the calculated difference between the determined desired engine and the detected actual engine speed;
- comparing the absolute value of the calculated difference with a predetermined constant stored in the memory means; and
- outputting a control signal to the flow control means for controlling the amount of fluid supplied to the hydraulic cylinder of the driving pulley when the predetermined constant is equal to or smaller than the absolute value of the calculated difference.

7. The method for controlling a continuously variable transmission according to claim 6, wherein said at least one relationship comprises a plurality of relationships, each relationship of said plurality of relationships corresponding to a vehicle speed.

8. An apparatus for controlling a continuously variable transmission in a vehicle, said continuously variable transmission comprising a driven pulley and a driving pulley, said driving pulley comprising a fixed member and a movable member, the movable member adapted to be moved by a hydraulic cylinder, said fixed member and said movable member shaped so as to form a V-shaped opening between the movable member and the fixed member, said driven pulley comprising a second fixed member and a second movable member, the second movable member adapted to be moved by a second hydraulic cylinder, and said second fixed member and said second movable member shaped so as to form a V-shaped opening therebetween, a belt member spanning the pulleys so that an effective diameter of the pulleys can be varied so that different speed ratios can be obtained, and a flow control means for controlling an amount of fluid supplied into the hydraulic cylinder of the driving pulley, said apparatus comprising:

means for detecting a throttle opening;

memory means for storing at least one relationship between desired engine speed and throttle opening for a vehicle speed and for storing a value indicative of a predetermined amount of throttle opening for said vehicle speed, said desired engine speed being maintained at a constant value in said at least one relationship when said means for detecting throttle opening detects a throttle opening which is less than said predetermined amount of throttle opening, said constant value being greater than a value of a point on said at least one relationship at which said continuously variable transmission is adjusted to a maximum speed ratio;

means for detecting an actual engine speed;

means for determining a desired engine speed according to said at least one relationship;

means for calculating a difference between the determined desired engine speed and the detected actual engine speed;

means for comparing the absolute value of said calculated difference with a predetermined constant stored in the memory means; and means for outputting a control signal to the flow control means for controlling the amount of fluid supplied to the hydraulic cylinder when the predetermined constant is equal to or smaller than the absolute value of the calculated difference.

9. The apparatus of claim 8, wherein said means for determining a desired engine speed receives signals from said means for detecting a throttle opening and said means for detecting an actual engine speed and selects a desired engine speed on the basis of said signals.

10. An apparatus for controlling a continuously variable transmission, said continuously variable transmission comprising a driven pulley and a driving pulley, said driving pulley comprising a fixed member and a movable member, the movable member being adapted to be moved by a hydraulic cylinder, said fixed member and said movable member shaped so as to form a V-shaped opening between the movable member and the fixed member, said driven pulley comprising a second fixed movable member, the second movable member, the second movable member adapted to be moved by a second hydraulic cylinder, and said second fixed member and said second movable member shaped so as to form a V-shaped opening between the second movable member and the second fixed member, a belt member spanning the pulleys so that an effective diameter of the pulleys can be varied so that different speed ratios can be obtained, and a flow control means for controlling an amount of fluid supplied into the hydraulic cylinder of the driving pulley, said apparatus comprising:

a memory means for storing at least one relationship between desired engine speed and throttle opening for at least one vehicle speed and for storing a value indicative of a predetermined amount of throttle opening for each of said at least one vehicle speeds, said desired engine speed being maintained at a constant value in said at least one relationship when said means for detecting throttle opening detects a throttle opening which is less than said predetermined amount of throttle opening, said constant value being less than value of a point on said at least one relationship at which said continuously variable transmission is adjusted to a maximum speed ratio;

means for detecting a throttle opening of a throttle valve provided in an engine intake system;

means for detecting a rotational speed of a driven pulley;

means for calculating an actual vehicle speed according to the detected rotational speed;

means for detecting a shift position;

means for determining a desired engine speed according to said at least one relationship;

means for comparing an absolute value of a difference between the desired engine speed and the detected actual engine speed with a predetermined constant; and means for outputting a control signal to the flow control means for controlling the amount of fluid supplied to the hydraulic cylinder of the driving pulley when the predetermined constant is equal to or smaller than the absolute value of the difference between the desired engine speed and the detected actual engine speed.

11. The apparatus according to claim 10, wherein said means for calculating an actual vehicle speed outputs a first signal, said means for detecting a throttle opening outputs a second signal and said means for determining a desired engine speed receives said first and second signals and determines desired engine speed on the basis of said detected throttle opening.

* * * * *